United States Patent [19]

Raevsky

[11] Patent Number: 4,849,298

[45] Date of Patent: Jul. 18, 1989

[54] FIRE-PROTECTIVE COATINGS, PAINTS AND VARNISHES

[76] Inventor: Vitaly Raevsky, 41/4 Shapira Street, Petah Tikva, Israel

[21] Appl. No.: 97,193

[22] Filed: Sep. 16, 1987

[30] Foreign Application Priority Data

Sep. 17, 1986 [IL] Israel ............................... 80059

[51] Int. Cl.$^4$ .......................... B32B 27/30; C09D 5/16
[52] U.S. Cl. ................... 428/522; 106/18.26; 428/698; 428/921
[58] Field of Search .......... 106/18.26; 162/159; 428/921, 354, 698, 500, 522

[56] References Cited

U.S. PATENT DOCUMENTS

| | | | |
|---|---|---|---|
| 1,702,285 | 2/1929 | Somoza | 427/297 |
| 3,741,929 | 6/1973 | Burton | 106/18.26 |
| 4,439,572 | 3/1984 | Kindrick | 106/18.27 |
| 4,462,831 | 7/1984 | Raevsky et al. | 106/18.26 |

FOREIGN PATENT DOCUMENTS

| | | | |
|---|---|---|---|
| 2518621 | 10/1976 | Fed. Rep. of Germany | 428/921 |
| 3028254 | 2/1982 | Fed. Rep. of Germany | 106/18.26 |

OTHER PUBLICATIONS

Clortex, Caffaro S.p.A., (1975).
Alloprene—Imperial Chemical Industries Limited.

*Primary Examiner*—Theodore Morris
*Attorney, Agent, or Firm*—Ostrolenk, Faber, Gerb & Soffen

[57] ABSTRACT

A fire-protective coating to be used with ordinary paints, or with fire-retardant paints, as a primer, as a filler or as both. The coating contains hydrated salt-forming compositions which produce, upon drying, crystallized water. For use as a primer, the coating contains a water solution of $Al_2(SO_4)_3$ or other alums. For use as a filler, $Al(OH)_3$ is employed.

10 Claims, No Drawings

FIRE-PROTECTIVE COATINGS, PAINTS AND VARNISHES

The present invention relates to fire-proof and fire-resistant coatings, e.g. for use in reducing flammability of wooden constructions—homes, public buildings (movie-houses, theaters, etc.), furniture, ships crates, etc., as well as for painting hardware. One of the main deficiencies of the overwhelming majority of now-existing coatings is that their fire-proof component contains water-soluble substances. Therefore, these coatings are not water or rain-resistant, which limits the possibilities of their use for painting exteriors. The existing paints, lacking such components, do not possess sufficient fire-protective properties. To solve this problem, a way had to be found to obtain coatings combining superior fire-protection with good resistance to water and to weather conditions. Such coatings can be produced in two ways:

1. By using, instead of prior art components, a water-resistant substance with no less effective fire-protective properties.
2. By using a primer which greatly increases fire-protective properties. The primer, when applied beneath the first layer of paint, is protected by the paint and therefore does not need to be water-resistant. Thus, the primer can be used in combination with water-resistant coatings, bringing fire-protecting properties up to the necessary level.

It is an object of the invention to use, as a fire-protective component or filler, Aluminium Hydroxide -Al(OH)$_3$. This filler is fully resistant to water and to any other atmospheric influences. When introduced in sufficient quantities, it imparts to the paint superior fire-protective properties. This substance is widely used as a filler for polyether binders, in glass fibers, in water-dispersing compositions at the base of carpets, and other applications. At present, commercially-available fire-retardant paints, such as those recommended by Imperial Chemical Industries Ltd. (I.C.I.) and Caffaro S.P.A., and based on the most fireproof polymer—Chlorinated Rubber—do not mention the use of Aluminium Hydroxide in their formulations, as can be seen in the following comparative table;

| I.C.I | | | Caffaro | |
|---|---|---|---|---|
| Allopren R-20[1] | 7.5. | 9.0 | Clortex 40[1] | 15 |
| Paralac 60 | — | 27.0 | — | |
| Cerechlor[2] | 12.5 | | Cloparin[2] | 12 |
| Tioxide (TiO$_2$) | 15.0 | 19.0 | Tioxide | 15 |
| Antimony oxide | 5.0 | 6.6 | Antimony oxide | 5 |
| Zinc borate | 2.0 | — | Zinc borate | 3 |
| Winnofil S[3] | 15.0 | — | Calcium carbonate | 8 |
| Lead octoate | — | 0.8 | — | |
| Cobalt octoate | — | 0.2 | — | |
| Aramasol H | 34.4 | 18.5 | | |
| White spirit | 8.6 | 14.8 | Solvents | 44 |
| Cellasolve Acetate | | 3.7 | | |

1. Chlorinated rubber, approximate formula (C$_{10}$H$_{11}$O$_7$). Chlorine content - ca 65%.
2. Chlorinated paraffinic hydrocarbon, with chlorine contents ranging from 40% to 70%, paraffin chain length from 10 to 24 carbon atoms.
3. Calcium carbonate - Ca CO$_3$.

1. Chlorinated rubber, approximate formula (C$_{10}$H$_{11}$O$_7$)$_x$. Chlorine content - ca 65%. 2. Chlorinated paraffinic hydrocarbon, with chlorine contents ranging from 40% to 70%, paraffin chain length from 10 to 24 carbon atoms. 3. Calcium carbonate - Ca CO$_3$.

According to another aspect of the invention it is proposed to use Al(OH)$_3$ in coatings without a primer, as well as in combination with same. In the first instance, coatings, in no way inferior to the existing ones as to fire-protective properties, and possessing the very substantial advantage of being water-resistant, are obtained. In the second instance, also obtained are water-resistant coatings with fire-protective properties exceeding those of any existing coatings. According to further aspect of the invention it is proposed to use, as a primer, aqueous solutions of Al$_2$(SO$_4$)$_3$ or other alums. When such solutions dry, hydrated salts are exuded, i.e., the salts contain crystallized water. These solutions perfectly impregnate, e.g. a wood surface, and the resulting layer of salts possesses superior adhesion to the wood and to the layers of paint applied over it. The crystallized water in the layer's content greatly improves the water-resistant quality of the wood surface, and the fire-protective properties of the coating as a whole. Several instances of use of hydrated salts (powdered alums) as fillers, introduced directly into polymer mixtures to obtain fire-resistant materials, are known. However, it has never been suggested to use alum solutions as primers. Such use is based on these salts'-capacity to form films - a property not generally inherent to low-molecule inorganic substances. The use of such alum solutions (formed on drying by complex salts containing crystallized water) as primers, with subsequent applications of ordinary (not fire-retardant) coatings, sharply reduces the flammability of the coatings. When fire-retardant coatings are applied over this primer, the fire-retardant properties of the coatings are greatly increased. Besides enhancing the fire-protective properties, such primer serves as a fungicide, as well as protection against decay and termites. The proposed coating system, consisting of the above-described primer and fire-retardant paint, possesses the following general properties:

Good fire protection: wood panels, plywood, polyurethanefoam and other flammable materials coated with such coatings do not ignite when exposed for a short time to match flames, cigarettes, sparks, or other sources of fire. When exposure to fire is prolonged, the panels will become ignited and will burn only in the area directly exposed to fire, without spreading to adjacent areas.

Coating the above-mentioned materials with paints and varnishes produced according to the invention transforms them from easily flammable (class I-III) materials into materials which extinguish themselves or do not burn at all (class IV-VI, according to Israel Standard 755 "Building materials classification according to their behavior during fire", Part B.)

They possess the following properties: Prolonged shelf-life; ease of application by spray, brush, roller, etc.; fast drying; good adhesion to wood, plywood, cardboard, paper, etc., excellent durability and weatherresistance; excellent paint-retention, water-proofing and hydro-isolation properties. Various examples of coatings were prepared based on the proposed method, and were tested according to Israel Standard No. 755; supplementary characteristics were obtained as well. Details of testing methods conforming to the Israel Standard No. 755, and of supplementary characteristics follow:

BEHAVIOR OF PAINTED AND UNPAINTED MATERIALS DURING FIRE

1. Classification of materials in accordance with criteria detailed in Israel Standard 755 "Building materials classification according to their behavior during fire", (Part B):

TEST METHOD

Specimens of the size 120×12×6 mm were tested in the flame of a Bunsen Burner. The test specimens were mounted in a clamstand so that the axis of the specimen was inclined downward, at 45 degrees from the horizontal. The Bunsen Burner flame is applied to the specimen for 30 seconds, after which period the specimen was examined for damage.

| Class of material | Reaction of material |
|---|---|
| I | Immediate ignition on exposure to flame and very rapid total burn-out. |
| II | Specimen ignites, continues to burn after removal of flame, and burns out in no more than 60 sec. from moment of exposure to flame. |
| III | Specimen ignites, continues to burn after removal of flame, and burns out in more than 60 sec. from moment of exposure to flame. |
| IV | Specimen ignites, and after removal of flame, continues to burn for more than 35 seconds from moment of exposure to flame before extinguishing itself. |
| V | Specimen ignites, and after removal of flame, continues to burn out but extinguishes itself in no more than 35 sec. from moment of exposure to flame. |
| VI | Specimen does not ignite on exposure to flame. |

Thus, materials of the I-III class burn, and propagate fire; those of the IV-VI class burn, but practically do not propagate fire, or do not ignite at all.

2. Additional characteristics.

TEST METHOD

The data rated:

Time of safe exposure to flame (t) - this is the time elapsing before the specimen ingnites. On ignition, the flame is removed. Whether the specimen continues to burn or extinguishes itself, is indicated.

Speed (V) of fire along the length of the specimen (the specimen being exposed to the flame for the whole period of test).

EXAMPLE 1

A layer of primer was applied on a pine board of the size 150×300×6 mm. The primer was a 45% solution of Al (SO ) in water. Coverage of primer—100/120 gr. per 1 m². Drying time (exposed to air)—2 hours. Thereafter, two layers of I.C.I. fire-retardant paint on the basis of Chlorinated Rubber-Alloprene R—20, were applied onto the primer. Drying time of the first layer of paint—1 hour; of the second—24 hours. Coverage of both layer—appr. 250 gr. per 1 m². Total thickness of dry coverage—appr. 65-70 microns. From this board, samples of 120×12×6 mm (conform Isr. Stand. 755) were sawn-off, and the butt-ends of the samples were also coated, as described above (one layer of primer and two layers of I.C.I. paint). Samples of plywood and other materials, listed in Table 1 (below) were prepared in the same manner. The results of the tests (conform Isr. Stand. No. 755) are shown in Table 1 (see numbers in parentheses).

EXAMPLE 2

Analogous to Example 1, but Caffaro S.P.A. (also on the base of Chlorinated Rubber) Clortex 20 fire-retardant paint was used. Test results are analogous to those shown in Table 1 (numbers in parentheses). In addition, the water-resistant properties of both paints were tested. To this end, plywood-base samples of a 100×100×6 mm size were painted. Each sample was placed on a water-filled glass (like a cover of the glass). The water was brought to boil, and the action of hot water vapors was observed for 3 hours. No alterations were discerned in the coating.

EXAMPLE 3

Analogous to Example 1 (first I.C.I. formula), but 35% $Al(OH)_3$ was introduced instead of Tioxide, Winnofil and Zinc Borate, as well as Tricresyl Phosphate instead of Cerechlor. This coating was applied without primer. Results of this test are shown in Table 1 (numbers in parentheses).

EXAMPLE 4

Analogous to Example 3, but coating applied with primer. Results of test are shown in Table 1 (numbers without parentheses). Note: Application of I.C.I. and Caffaro coatings without primer reduced the degree of flammability to its minimal values of the class in question, albeit, as a rule, within the limits of that class. The paint (coating) itself does not burn. In other words, although these paints do not burn, they are not efficient for sharply reducing the flammability of wood and similar materials. It follows from the data shown above that:

1. The use of the proposed primer $Al_2(SO_4)_3$ greatly increases the fire-protective properties of I.C.I. and Caffaro coatings, by one class of the Israeli Standard No. 755.

2. The introduction of $Al(OH)_3$ into these paints, without using a primer, gives analogous results.

3. The use of both a primer and $Al(OH)_3$ results in an increase of fire-protective properties (i.e. a reduction of flammability) by two classes.

TABLE 1

RESULTS OF TESTS RUN ON UNPAINTED AND PAINTED SPECIMENS
Materials whose size and test conditions are in conformity with Isr. St. 755.

| | MATERIALS | | | | |
|---|---|---|---|---|---|
| | WITHOUT PAINT | | | WITH COATING (SPREADING RATE APPR. 250 GR PER 1M²) | |
| Materials | Class (I.S.755) | t. sec | V mm/sec | Class (I.S.755) | t. sec | V mm/sec Additional characteristics |
| Plywood | III | 5-8 | Appr. 0.5 | (IV)-V | (20)-30 | Extinguishes itself |

TABLE 1-continued
RESULTS OF TESTS RUN ON UNPAINTED AND PAINTED SPECIMENS
Materials whose size and test conditions are in conformity with Isr. St. 755.

| | MATERIALS | | | | | |
|---|---|---|---|---|---|---|
| | WITHOUT PAINT | | | WITH COATING (SPREADING RATE APPR. 250 GR PER 1M$^2$) | | |
| | Class | Additional Characteristics | | Class | Additional characteristics | |
| Materials | (I.S.755) | t. sec | V mm/sec | (I.S.755) | t. sec | V mm/sec |
| Pine | II-III | 2-4 | Appr. 1 | (IV)-V | (7)-10 | Extinguishes itself |
| Cork | II | 2-3 | 2-3 | (IV)-V | (6)-8 | Extinguishes itself |
| Rubber | I-II | 1-3 | 1.7-2 | (III)-IV | (4)-6 | Extinguishes itself |
| Hard polyurethane foam: | | | | | | |
| Section (cut) coated | 1 | 1 | 10-12 | (V)-VI | | Does not ignite, |
| Shell coated (wall coating of polyurethane foam) | 1 | 1 | 10-12 | (V)-VI | | does not burn, |
| Smooth shell coated (moulding of polyurethane foam) | 1 | 1 | 10-12 | (V)-VI | | though carbonizes |

TABLE 2
Materials whose thickness exceeds or does not reach the requirements of I.S. 755 (i.e., exceeds or does not reach 6 mm).

| | MATERIALS | | | | | |
|---|---|---|---|---|---|---|
| | WITHOUT PAINT | | | WITH COATING (SPREADING RATE APPR. 250 GR PER 1M$^2$) | | |
| | Class | Additional Characteristics | | Class | Additional characteristics | |
| Materials | (I.S.755) | t. sec | V mm/sec | (I.S.755) | t. sec | V mm/sec |
| Pine element or real board 120 × 12 × 15 mm | — | 5-7 | 0.9-1.0 | — | (10)-15 | On introduction into flame, the materials (after t sec.) ignite |
| 120 × 12 × 2.5 mm | — | 1-3 | 1.1-1.3 | — | (7)-10 | for a short time, burn out |
| Monolithic cardboard, element of real sheet 120 × 12 × 0.8 mm | — | 1-2 | 1.9-2.0 | — | (5)-7 | and carbonize in the section under direct action of the flame, then cease burning |
| Comb; cardboard, element of real sheet 120 × 12 × 3.9 mm | — | 0.5-1 | appr. 5 | — | (8)-12 | even without being taken out of fire-i.e., the fire does not spread at all. |

NOTE:
(1) In the area of contact with flame, test specimen carbonizes.
(2) Numbers in parentheses refer to Examples 1.2.3; numbers without parentheses - to Example 4.

CONCLUSIONS

Coating the above-mentioned materials with the paint transforms them from highly flammable (Class I—III) materials into materials which extinguish themselves or do not burn at all (Class IV—VI).

Thus, the coatings otained by me according to the invention combine superior fire-protective properties with high water-resistance (even to vapors of boiling water). These coatings can, without doubt, find a wide use.

Suggested uses:

Substitution of flammable paints for coating of wood structures, since the flammable paints may be a source of fire which may spread along the coated surface.

Domestic and industrial, interior and exterior applications, such as ceilings, doors, kitchen shelves, interior and exterior walls, railings, and other structures made of wood and other materials.

Interior and exterior of ships wooden structures (including cabins).

Painting of boxes for explosives, bullets, cartridges, mines; and containers for shells.

Painting of roofs covered with polyurethane foam, as well as walls of cold-storage warehouses insulated with polyurethane foam.

FIELDS OF APPLICATION (USES)

Coating with paint or varnish:

wooden houses, and wooden structures of concrete and brick building.

furniture, especially in hotels, offices, theaters, movie-houses, etc.

substitutes for inflammable paints and varnishes (including those applied on metal structures and articles) in transportation industry (especially for the armed forces), and in application on metal boxes and cases, etc.

wooden components of ships, storage tanks, wooden boats, etc.

wooden poles for electricity and telephone lines, etc.

wooden and cardboard boxes and containers for shells and explosives

Polyurethane heat isolation for pipelines, walls of freezers, cold-storage rooms, etc.

in some cases, the paint can be used as glue, e.g., in pasting PVC - linoleum onto plywood (on navy torpedo-boat decks).

What is claimed is:

1. A fire protective coating having a primer layer of a material comprising hydrated alum salt, and further having, in intimate contact with said primer layer, a second layer of a film-forming material comprising an amount of aluminum hydroxide effective to retard ignition of said coating material upon exposure to flame.

2. The fire protective coating according to claim 1, wherein said hydrated alum salt is a hydrated aluminum sulfate.

3. The fire protective coating according to claim 1, wherein said primer layer is formed by applying aqueous alum, and wherein said primer layer is allowed to dry prior to applying said second layer thereto.

4. The fire protective coating according to claim 3, wherein said aqueous alum is aqueous aluminum sulfate.

5. The fire protective coating according to claim 4, wherein said aqueous aluminum sulfate comprises a solution containing about 40% to about 50% aluminum sulfate by total weight of the solution.

6. The fire protective coating according to claim 7, wherein said second layer comprises a chlorinated rubber compound.

7. The fire protective coating according to claim 6, wherein said chlorinated rubber compound is present in said second layer at a concentration between about 7.5% and about 15%.

8. A fire protective coating having a primer layer comprising hydrated aluminum sulfates, said primer layer having coated thereon a second layer of a fire-retardant paint comprising a chlorinated rubber compound and an amount of an aluminum hdyroxide filler effective to enhance said coating's resistance to ignition upon exposure to flame.

9. The fire protective coating according to claim 8, wherein the total thickness of said coating is from about 65 to about 70 microns.

10. The fire protective coating according to claim 8, wherein said aluminum hydroxide is present in said second layer at a concentration of approximately 35% by weight.

* * * * *